US007103534B2

(12) United States Patent
Goodman (10) Patent No.: US 7,103,534 B2
(45) Date of Patent: Sep. 5, 2006

(54) MACHINE LEARNING CONTEXTUAL APPROACH TO WORD DETERMINATION FOR TEXT INPUT VIA REDUCED KEYPAD KEYS

(75) Inventor: Joshua T. Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 09/823,619

(22) Filed: Mar. 31, 2001

(65) Prior Publication Data
US 2003/0023420 A1 Jan. 30, 2003

(51) Int. Cl.
*G06F 17/20* (2006.01)
*G06F 17/21* (2006.01)
(52) U.S. Cl. ............................. 704/9; 704/10
(58) Field of Classification Search .............. 704/9, 704/1, 10, 257; 715/529, 534
See application file for complete search history.

(56) References Cited

U.S. PATENT DOCUMENTS

| | | | | | |
|---|---|---|---|---|---|
| 5,418,717 | A | * | 5/1995 | Su et al. ......................... | 704/9 |
| 5,627,980 | A | | 5/1997 | Schilit et al. ................ | 395/353 |
| 5,818,437 | A | | 10/1998 | Grover et al. .............. | 345/326 |
| 5,828,991 | A | * | 10/1998 | Skiena et al. .................. | 704/9 |
| 5,953,541 | A | * | 9/1999 | King et al. .................... | 710/67 |
| 5,974,121 | A | * | 10/1999 | Perera et al. ............. | 379/93.18 |
| 6,002,390 | A | | 12/1999 | Masui ......................... | 345/173 |
| 6,005,495 | A | * | 12/1999 | Connolly et al. .............. | 341/22 |
| 6,011,544 | A | | 1/2000 | Sato ............................ | 345/168 |
| 6,018,736 | A | * | 1/2000 | Gilai et al. ..................... | 707/6 |
| 6,169,538 | B1 | | 1/2001 | Nowlan et al. ............. | 345/168 |
| 6,271,835 | B1 | | 8/2001 | Hoeksma ..................... | 345/168 |
| 6,415,248 | B1 | * | 7/2002 | Bangalore et al. ............. | 704/1 |
| 6,621,424 | B1 | * | 9/2003 | Brand ......................... | 341/22 |
| 6,741,235 | B1 | | 5/2004 | Goren ........................ | 345/173 |
| 6,782,357 | B1 | * | 8/2004 | Goodman et al. ............. | 704/9 |
| 6,789,057 | B1 | * | 9/2004 | Morimoto et al. ............. | 704/2 |
| 6,801,190 | B1 | * | 10/2004 | Robinson et al. ........... | 345/173 |
| 2002/0126097 | A1 | | 9/2002 | Savolainen ................. | 345/168 |
| 2002/0180689 | A1 | | 12/2002 | Venolia ...................... | 345/156 |
| 2002/0188448 | A1 | | 12/2002 | Goodman et al. .......... | 704/254 |
| 2003/0011574 | A1 | | 1/2003 | Goodman ................... | 345/172 |

OTHER PUBLICATIONS

F. Jelinek, "Self Organized Language Modeling for Speech Recognition", Language Processing for Speech Recognition, pp. 450-503.
K. Seymore et al., "Scalable Backoff Language Models", In Proc. ICSLP, vol. 1, pp. 232-235, Philadelphia, 1996.
Stolcke, "Entropy-based Pruning of Backoff Language Models", Proc. DRAPA News Transcription and Understanding Workshop, pp. 270-274, Lansdowne, VA.

(Continued)

*Primary Examiner*—David Hudspeth
*Assistant Examiner*—James S. Wozniak
(74) *Attorney, Agent, or Firm*—Westman, Champlin & Kelly; Linda P. Ji (57) ABSTRACT

Determination of a word input on a reduced keypad, such as a numeric keypad, by entering a key sequence ambiguously corresponding to the word, by taking into account the context of the word via a machine learning approach, is disclosed. Either the left context, the right context, or the double-sided context of the number sequence can be used to determine the intended word. The machine learning approach can use a statistical language model, such as an n-gram language model. The compression of a language model for use with small devices, such as mobile phones and other types of small devices, is also disclosed.

44 Claims, 4 Drawing Sheets

OTHER PUBLICATIONS

Chen et al., "An Empirical Study of Smoothing Techniques for Language Modeling", TR-10-98, Computer Science Group, pp. 1-64, Harvard University, 1998.

Lehikoinen et al., "BinScroll: Rapid Selection Technique for Alphanumeric Lists", CHI 2000, pp. 261-262, Apr. 1-6, 2000.

Ahlberg et al., "the Alphaslider: A Compact and Rapid Selector", Proc. CHI 94, p. 365-371.

* cited by examiner

MACHINE LEARNING CONTEXTUAL APPROACH TO WORD DETERMINATION FOR TEXT INPUT VIA REDUCED KEYPAD KEYS

FIELD OF THE INVENTION

The invention relates generally to text input using a reduced keypad, such as a numeric keypad, and more particularly to determining words corresponding to key sequences entered using this keypad.

BACKGROUND OF THE INVENTION

Mobile phones, and other devices having only a limited set of input keys, have become increasingly popular. While the numeric keys of a mobile phone are adequate for entering phone numbers and other number sequences, they are difficult to use for entering text. A standard keyboard has keys for both letters and numbers, whereas the numeric keys of a mobile phone have no intuitive way by which to enter text. Text may need to be entered on such devices, for example, to associate a name with a phone number in an address book. Since mobile phones and other such devices are becoming more popular for accessing the Internet, such as to browse web sites and send and receive email, this limitation will likely become increasingly acute in the future.

Currently, there are two common ways to achieve text input using numeric keys, a multiple-tap approach, and a single-tap approach. With the multiple-tap approach, a user presses a numeric key a number of times to enter the desired letter, where most of the numeric keys are mapped to three or four letters of the alphabet. For example, the two key is usually mapped to the letters A, B, and C. If the user presses the two key once, the letter A is entered. If the user presses the two key twice, the letter B is entered, and if the user presses the two key three times, the letter C is entered. Pauses between entry of successive letters of a word are often necessary so that the device knows when to advance the cursor to the next letter-entry position. For example, to enter the word "cab," the user presses the two key three times to enter the letter C, pauses, presses the two key once to enter the letter A, pauses again, and presses the two key twice to enter the letter B. To enter numbers, symbols, or switch between upper- and lower-case letters, typically other keys that are present on numeric keypads, such as the pound ("#") and asterisk ("*") keys, among other keys, are mapped for these purposes.

While the multiple-tap approach is usable in that users can enter any word using only the numeric keys, it is disadvantageous for quick and intuitive text entry. A word such as "cab" that only requires three key presses on a standard keyboard, one for each letter, requires six key presses on numeric keys using the multiple-tap approach. As compared to using a standard keyboard, using numeric keys with the multiple-tap approach to achieve text entry means that the user presses many keys even for short messages. Furthermore, errors can be frequent. For example, if the user intends to enter the letter B, but pauses too long between the first and second presses of the two key, two letters A will be entered instead. The device in this case interprets the pause as the user having finished with the current letter entry, an A, and proceeds to the next letter-entry position, where it also enters an A.

Another approach to text entry using numeric keys is the single-tap approach, which is also known as the Tegic approach, for the company that popularized it. Under the single-tap approach, the user presses the numeric key associated with the desired letter once, even though the numeric key may be mapped to three or four different letters. When the user is finished entering a number sequence for a word, the device attempts to discern the word that the user intended to enter, based on the number sequence. Each number sequence is mapped to a common word that corresponds to the sequence. For example, the number sequence 43556 can potentially correspond to any five-letter word having a first letter G, H, or I, since the four key is usually mapped to these letters. Similarly, the sequence potentially corresponds to any five-letter word having a second letter D, E, or F, a third and fourth letter selected from the letters J, K, and L, and a fifth letter M, N, or O, since the three, five, and six keys are usually mapped to these respective letters. However, because the most common five-letter word corresponding to the number sequence 43556 is the word "hello," the single-tap approach always enters this word when the user presses the four, three, five, five, and six keys in succession to input this number sequence.

The single-tap approach has advantages over the multiple-tap approach, but presents new disadvantages. Advantageously, the single-tap approach ensures that the user only has to press the same number of keys as the number of letters in a desired word. For example, the multiple-tap approach requires the user to press the two key six times to enter the word "cab." Conversely, the single-tap approach potentially only requires the user to press the two key three times to enter this word, assuming that the number sequence 222 is mapped to the word "cab." Therefore, the single-tap approach is more key-efficient than the multiple-tap approach for text entry using numeric keys. It is as key-efficient as using a standard keyboard that has a single key for each letter.

The single-tap approach is disadvantageous in that the word mapped to a given number sequence may not be the word the user intended to enter by inputting the sequence. For example, the numeric key sequence 7333 corresponds to both the words "seed" and "reed." Because only one word is mapped to each numeric key sequence, the word "seed" may be entered when the user keys in the numeric key sequence 7333, whereas the user may have intended to enter the word "reed." The single-tap approach is primarily useful where there is only one unique word for a given numeric key sequence, or, if there are a number of words for a given sequence, when the user wishes to input the most common word associated with the sequence. For entry of uncommon words corresponding to number sequences to which words that are more common also correspond, the approach is less useful. The single-tap approach is also not useful for the entry of all but the most common proper names, and scientific, legal, medical, and other specialized terms, all of which will not usually be mapped to number sequences. Where the word mapped by the single-tap approach is not the intended word, text entry may revert back to the multiple-tap approach, or to an error-correction mode. Ultimate text entry of the intended word may then require more keystrokes than if the user had started with the multiple-tap approach.

The problem of a given number sequence mapping to multiple words is referred to as the ambiguity limitation of the single-tap approach. Some prior art approaches exist to overcome this limitation by attempting to disambiguate the intended word when the user enters a number sequence that corresponds to more than one word. One disambiguation approach is to show the user a number of different words that correspond to the entered number sequence, in order of decreasing frequency of use—that is, in decreasing order of how common the different words are. The user then selects a word from the list. This approach is described in detail in U.S. Pat. No. 5,953,541, issued on Sep. 14, 1999. The primary disadvantage to this disambiguation approach is that after the user has entered the number sequence, he or she is forced to expend additional effort reviewing the presented list of words, and selecting the desired word from the list. While this may be better than forcing the user back into a multiple-tap approach to reenter the intended word with additional keystrokes, it still can considerably delay text entry using numeric keys.

An improvement to this disambiguation approach is described in detail in U.S. Pat. No. 6,011,554, issued on Jan. 4, 2000, and which is a continuation-in-part of the patent application that issued as U.S. Pat. No. 5,818,437 on Oct. 6, 1998. Under the improved disambiguation approach, the word corresponding to the entered number sequence that has the highest frequency of use is automatically selected by default when the user begins to enter a new number sequence using the numeric keys. This is advantageous because, if the user's intended words are those having the highest frequency of use for the entered number sequences, the user does not have to select them from presented lists. However, at best occasionally, and at worst frequently, the user still has to select the desired word from a list, when the desired word is not the word with the highest frequency of use for the entered number sequence. This means that text entry delays are still inevitable even with this improved disambiguation approach.

Perhaps the primary disadvantage to either the original disambiguation approach, or the improved disambiguation approach, is that the order of words presented in the list intrinsically depends on only the current number sequence entered by the user. The described disambiguation approaches only consider the frequency of use of the words that correspond to the current number sequence in ordering the list of words from which the user can select a desired word. For a given number sequence entered, the list of words presented to the user is always the same. Therefore, using one of the previously described examples, when the user enters the number sequence 7333, if the word "seed," which corresponds to this number sequence, has a higher frequency of use than the word "reed," which also corresponds to the sequence, the former word is always displayed in the list ahead of the latter word. The list of words does not take into account that in some situations the word "reed" is a better choice than the word "seed." As an example, if the user is entering the sentence "The first reed is shorter than the second reed," the device will present the user with the word "seed" for both the first and the second time the user enters in the sequence 7333 for the intended word "reed." The device does not discern that if the user has most recently selected the word "reed" for the sequence 7333, the user more likely wishes to enter this word, and not "seed," when entering the sequence again.

The primary improvement that the described disambiguation approaches have over the single-tap approach is that they provide the user with a list of alternative words from which a less common word can be selected. The most common word, which is always selected by the single-tap approach, is still the word at the top of the list in the original disambiguation approach, and is the word that is selected by default in the improved disambiguation approach. The word selected by the device as the most likely intended word under all these approaches is still based on a commonality measure, or frequency of use measure, of the words corresponding to and considering only the entered number sequence. While these prior art approaches may successfully guess the intended word most of the time, they are still unsatisfactory. The user is still forced to at least occasionally select other words corresponding to entered number sequences, and not accept the proposed, most common words corresponding to the sequences. Furthermore, where the user is entering many proper nouns, or specialized, uncommon terms, the user is more likely to have to select other words corresponding to the entered sequences, and not accept the proposed, most common words corresponding to them, more often than not. For these reasons, as well as other reasons, there is a need for the present invention.

SUMMARY OF THE INVENTION

The invention relates to using context via a machine learning approach to determine an intended word corresponding to a sequence on a reduced keypad, such as a number sequence entered by the user on a numeric keypad. Most of the keys are mapped to three or four letters. For example, on a numeric keypad, the six key is usually mapped to the letters M, N, and O. The user uses a single-tap approach to enter a number sequence corresponding to an intended word. For example, the user may enter the number sequence 66 for the word "on." A word-determining logic determines the intended word by examining the context in which the number sequence for the word was entered. As an example, for the number sequence 66, if it appears following the words "We know of absolutely," the word-determining logic is likely to determine that the user had intended the word "no" to be entered when he or she input the sequence 66. Conversely, if the sequence appears following the words "We will focus," the word-determining logic is likely to determine that the user had intended the word "on" to be entered when he or she input the sequence 66.

The context-based approach of the invention is advantageous over other improvements to the single tap approach. Because the context in which an input sequence has been entered is considered, the word-determining logic of the invention is more likely to correctly guess the word the user intended to enter. Using the example of the previous paragraph, in the case of the single tap approach of the prior art, the word "on" may always be mapped to the number sequence 66. Therefore, the word "on" would always be displayed to the user when he or she enters in the sequence 222, regardless of the context in which the word was entered. The prior art improvements to the single tap approach may only list alternatives to the word "on," such as the word "no," but still indicate the word "on" as the most likely word. In either case, if the user intended to enter the word "no," he or she is forced to expend additional effort selecting the correct word, or correcting the wrong word. By comparison, the invention is more likely to guess the correct word in the first instance. This means that text entry using numeric keys is likely to be much faster using the invention than not using the invention.

Methods and devices of varying scope are encompassed by the invention. Other aspects, embodiments and advantages of the invention, beyond those described here, will become apparent by reading the detailed description and by referencing the drawings. The invention is substantially described with respect to a numeric keypad. However, the invention itself is applicable to any set of reduced keys, referred to generally as a reduced keypad. A reduced keypad is defined non-restrictively as a number of keys, where each of one or more of the keys is mapped to, or corresponds to, more than one letter. For example, a numeric keypad is a reduced keypad, because typically most of the number keys are mapped to three or four different letters.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview

Figure 1:
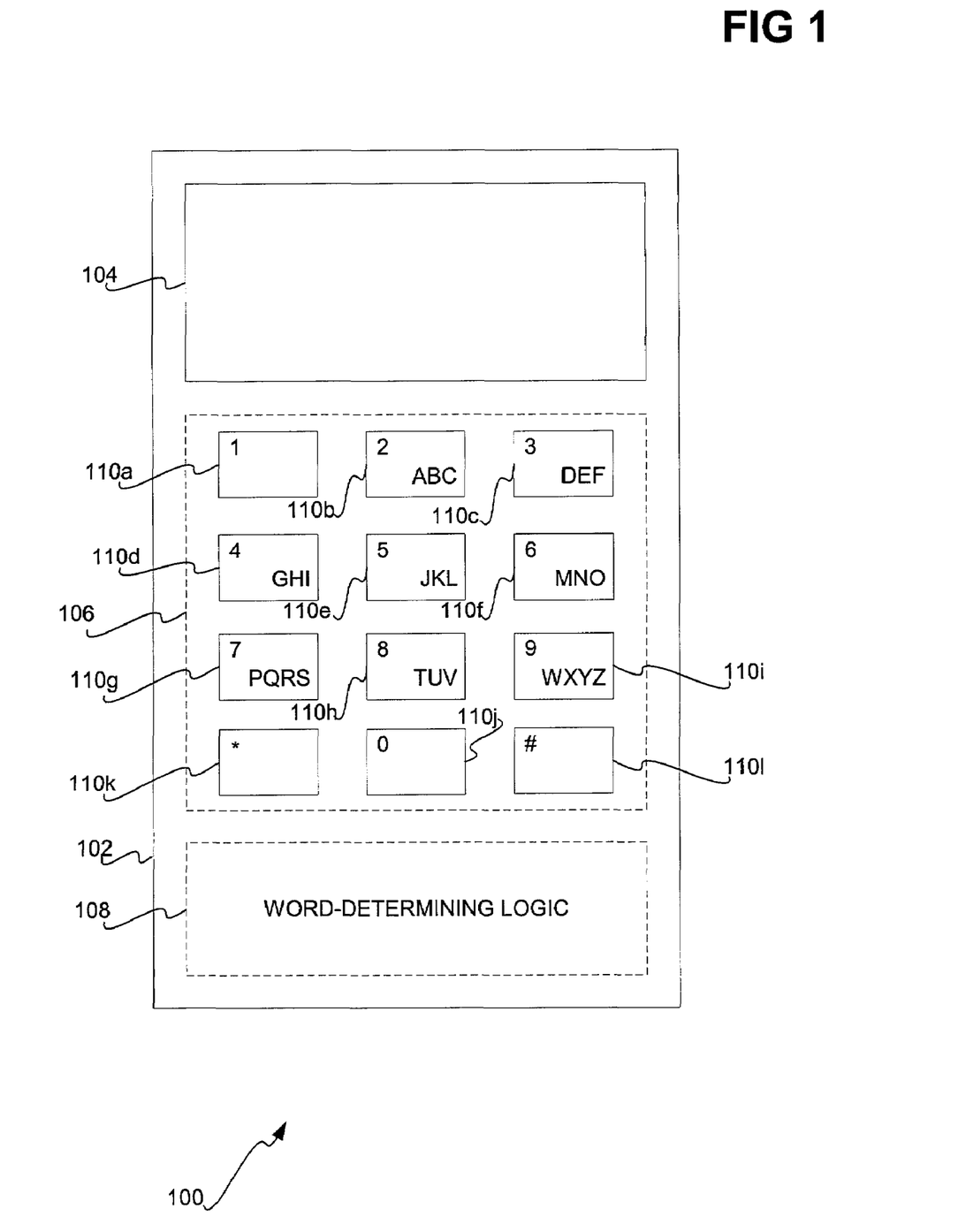
FIG. 1 is a diagram of an example device apparatus according to an embodiment of the invention.

FIG. 1 is a diagram 100 showing an example device 102 according to an embodiment of the invention. The device 102 can be a telephone, such as a mobile phone, a cordless phone, a corded phone, a radio phone, or another type of telephone. The device 102 can also be a device other than a telephone. For example, the device 102 may be a computer, such as a desktop computer, a laptop computer, a handheld computer, or another type of computer. As another example, the device 102 may be a handheld device such as a personal-digital assistant (PDA) device, a remote control, a pager, or another type of device.

The device 102 has at least a display 104, a (typically numeric) keypad 106, and a word-determining logic 108. The device 102 may have other components besides those shown in FIG. 1. The display 104 is used to convey information visually to the user. This information can include visual feedback regarding the entry the user is effecting by pressing keys on the numeric keypad 106. The display 104 is typically a small, flat display, such as a liquid crystal display (LCD). However, the display 104 can also be a larger display, such as a cathode-ray tube (CRT) display, or another type of larger display, such as a larger LCD or other flat-panel display (FPD).

The numeric keypad 106 includes a number of numeric keys, as well as other types of keys. In general, the numeric keypad 106 is distinguished from a standard keyboard in that it does not have a unique key for each letter. As such, the numeric keypad 106 is referred to as having a reduced or a limited set of keys. In particular, the numeric keypad 106 has the following number keys: a one key 110a, a two key 10b, a three key 110c, a four key 110d, a five key 110e, a six key 110f, a seven key 110g, an eight key 110h, a nine key 110i, and a zero key 110j. The numeric keypad 106 also has an asterisk key 110k, and a pound sign key 110l. The numeric keypad 106 may also have other specialized keys beyond those shown in FIG. 1. The layout of the keys of the numeric keypad 106 as shown in FIG. 1 is typical of that found on most telephones, such as mobile phones. The keys of the numeric keypad 106 may be real, physical keys, or virtual, soft keys displayed on the display 104, where the display 104 is a touch-sensitive screen.

All of the number keys of the numeric keypad 106, except for the one key 110a and the zero key 110j, correspond to three or four letters of the alphabet. The two key 110b corresponds to the letters A, B, and C. The three key 110c corresponds to the letters D, E, and F. The four key 110d corresponds to the letters G, H, and I. The five key 110e corresponds to the letters J, K, and L. The six key 110f corresponds to the letters M, N, and O. The seven key 110g corresponds to the letters P, Q, R, and S. The eight key 110h corresponds to the letters T, U, and V. Finally the nine key 110i corresponds to the letters W, X, Y, and Z. That a given number key corresponds to three or four specific letters means that the number key is pressed one or more times by the user to signify input of any of the specific letters.

In the context of the invention, the user uses the numeric keys of the numeric keypad 106 to enter a number sequence corresponding to a word using the single-tap approach. For each letter the user wishes to enter, the user presses the numeric key corresponding to the letter. For example, to enter the word "hello," the user presses the four key 110d, the three key 110c, the five key 110e twice, and the six key 110f, in succession. Because the number sequence entered, 43556, may correspond to other words than the word "hello," the intended word is ambiguous. The device 102 therefore employs a word-determining logic 108 to disambiguate the word. The logic 108 is designed to determine the word or words corresponding to numeric key input entered by the user on the numeric keypad 106.

Significantly, the logic 108 makes this determination based on the context of the numeric key input. The logic 108 examines the words, or their corresponding number sequences, that have already been entered to the left and/or the right of the current numeric key input to assist in determining what word the user intended to enter with the current numeric key input. The logic 108 may display the results of its determination on the display 104. The logic 108 uses in general a machine learning approach to determine the word corresponding to the current numeric key input based on the context. The word-determining logic 108 can be implemented as a computer program stored on a computer- or machine-readable medium such as a memory, and executed by a processor.

As an example of the type of determination performed by the logic 108, the user may have already entered the words "The situation has run," and is currently entering a word corresponding to the number sequence 2665. The number sequence 2665 corresponds to at least two words, "amok" and "bonk." In the context of the words already entered by the user, the word-determining logic 108 may likely select the word "amok" as the intended word of the user, and not the word "bonk." In the context of the previously entered words to the left of the entered sequence, referred to as the left context of the current number sequence, the word "amok" is more likely to occur than the word "bonk." However, if the user has already entered the words "With the ball I shall," and then enters the number sequence 2665, the word-determining logic 108 may likely select the word "bonk" instead of the word "amok." In this case, in the left context of the number sequence entered, the word "bonk" is more likely to occur than the word "amok." The word-determining logic 108 selects a word not only by considering the current number sequence, but also the context in which the current number sequence has been entered.

In the examples of the previous paragraph, the context was referred to as the left context. More specifically, the left context of a current number sequence refers to all the words and/or number sequences to the left of the current number sequence. The word-determining logic 108 may also consider the right context of the current number sequence. The right context of the current number sequence refers to all the words and/or number sequences to the right of the current number sequence. Word determination based on the right context may come about in one of two situations. First, the user may have already entered a number of words, and is inserting a word within the words already entered. In this situation, the specific number sequence entered by the user has a right context in addition to a left context. Second, the user may enter in a number of number sequences corresponding to words, such that the logic 108 does not resolve the sequences into words until the user has finished entering the sentence. In this situation, each number sequence except for the last sequence has a right context.

Alternatively, the logic 108 may continually reevaluate the determined word based on additional words the user enters. For example, the user may intend to enter the sentence "The ball is what I kicked." Up until the user enters the number sequence corresponding to the word "kicked," the word-determining logic 108 may select the word "call" for the number sequence 2255, instead of the word "ball." However, the logic 108 may continually reevaluate all words based on new words entered. Once the user enters the number sequence corresponding to the word "kicked," the logic 108 may go back and select the word "ball" for the number sequence 2255, instead of the word "call." In general, the logic 108 can use the left context of the current number sequence, the right context of the current sequence, or both the left and the right contexts, which is also referred to as double-sided context.

In addition, the word-determining logic 108 may determine a word based on the number sequence entered by the user as corresponding to an initial part of the word, and not the complete word. As an example, the user may be entering the words "good enough." When the user has pressed the numeric keys corresponding to all except the last letter of the word "enough," which is the number sequence 36684, the word-determining logic 108 may be able to determine that the user is entering the word "enough." This is even though the user has not pressed the four key a final time to enter the letter H. Note that the user could have intended to enter the words "good ennui," but it is significantly more likely that the number sequence 36684 corresponds to all except the last letter of the word "enough," and not the complete word "ennui."

As has been indicated, the word-determining logic 108 uses a machine learning approach to determine the word corresponding to an entered number sequence based on the context of the sequence. In general, machine learning refers to a system capable of the autonomous acquisition and integration of knowledge. This capacity to learn from experience, analytical observation, and other mechanisms, results in a system that may continuously self-improve and thereby offer increased efficiency and effectiveness. More succinctly, a machine learning approach is an approach that improves automatically through experience.

One type of machine learning approach that can be used is a statistical language model. Generally, a language model estimates the probability of a sequence of language units, such as words. For example, if $\omega$ is a specified sequence of Q words, $$\omega = \omega_1, \omega_2, \ldots, \omega_Q \tag{1}$$

then the language model estimates the probability $p(\omega)$. This probability is equal to $$p_N(\omega) = \prod_{i=1}^{Q} p(\omega_i | \omega_1, \omega_2, \ldots, \omega_{i-1}) \tag{2}$$

Assuming that the probability of each word depends only on the previous N words, this can be approximated by $$p_N(\omega) = \prod_{i=1}^{Q} p(\omega_i | \omega_{i-n+1}, \omega_{i-n+2}, \ldots, \omega_{i-1}) \tag{3}$$

which is known and referred to as an n-gram language model, where n is greater than or equal to 1. In general, these probabilities are evaluated by occurrence counting in any type of database, such as a database of magazine articles, books, newspapers, or another type of database. In general, n-gram language models are impractical except for the cases where n is 1, 2 or 3. Where n is 2, the n-gram language model is more specifically referred to as a bigram language model. Similarly, where n is 3, the n-gram language model is more specifically referred to as a trigram language model.

An n-gram language model can therefore be the machine learning approach used by the word-determining logic 102 to determine the intended word corresponding to a number sequence entered by the user with the numeric input keys of the numeric keypad 106. That is, an n-gram model can be used to examine the previous n-1 words to determine the current, nth, word corresponding to the current number sequence. An n-gram model is generally constructed by examining a database, or training corpus, as has been described. The model can be improved over time by retraining the model with more complete databases, or by considering what the user has him or herself specifically entered in the past. The latter is referred to as using a cache model, where the last x words entered are stored in a cache. In subsequent sections of the detailed description, two specific language models are described in more detail, an n-gram model considering only the left context of the current number sequence, and an n-gram model considering both the left and the right context of the current number sequence. The manner by which a language model can be compressed is also described in a subsequent section of the detailed description.

Figure 2:
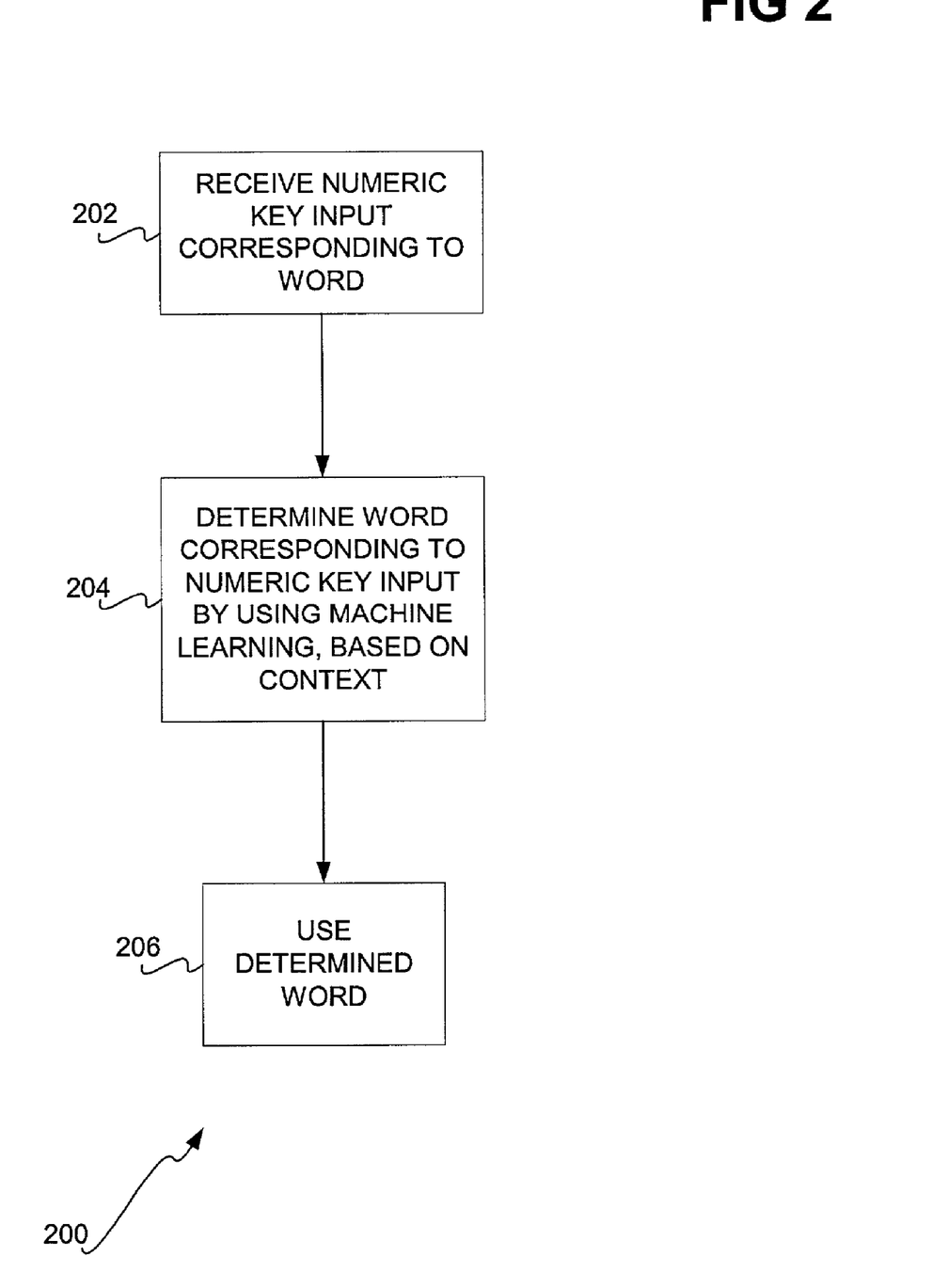
FIG. 2 is a flowchart of a method summarizing the invention.

To summarize the preceding description, reference is made to FIG. 2, which is a flowchart of a method 200 according to an embodiment of the invention. The method 200 can be performed by the device 102 of FIG. 1. In 202, the device 102 receives numeric key input corresponding to a word, where the input has a left context, a right context, or both. In 204, the device 102, and more specifically the word-determining logic 108 of the device 102, determines the word corresponding to the numeric key input. As has been described, the logic 108 makes this determination by using a machine learning approach, based on either the left context, the right context, or both, of the numeric key input. The device 102 may then use the word in 206, as has been determined in 204. The focus of the next two sections of the detailed description is the manner by which the logic 108 makes the determination in 204, in accordance with specific embodiments of the invention.

N-Gram Language Model for Word Determination Based on Left Context

Figure 3:
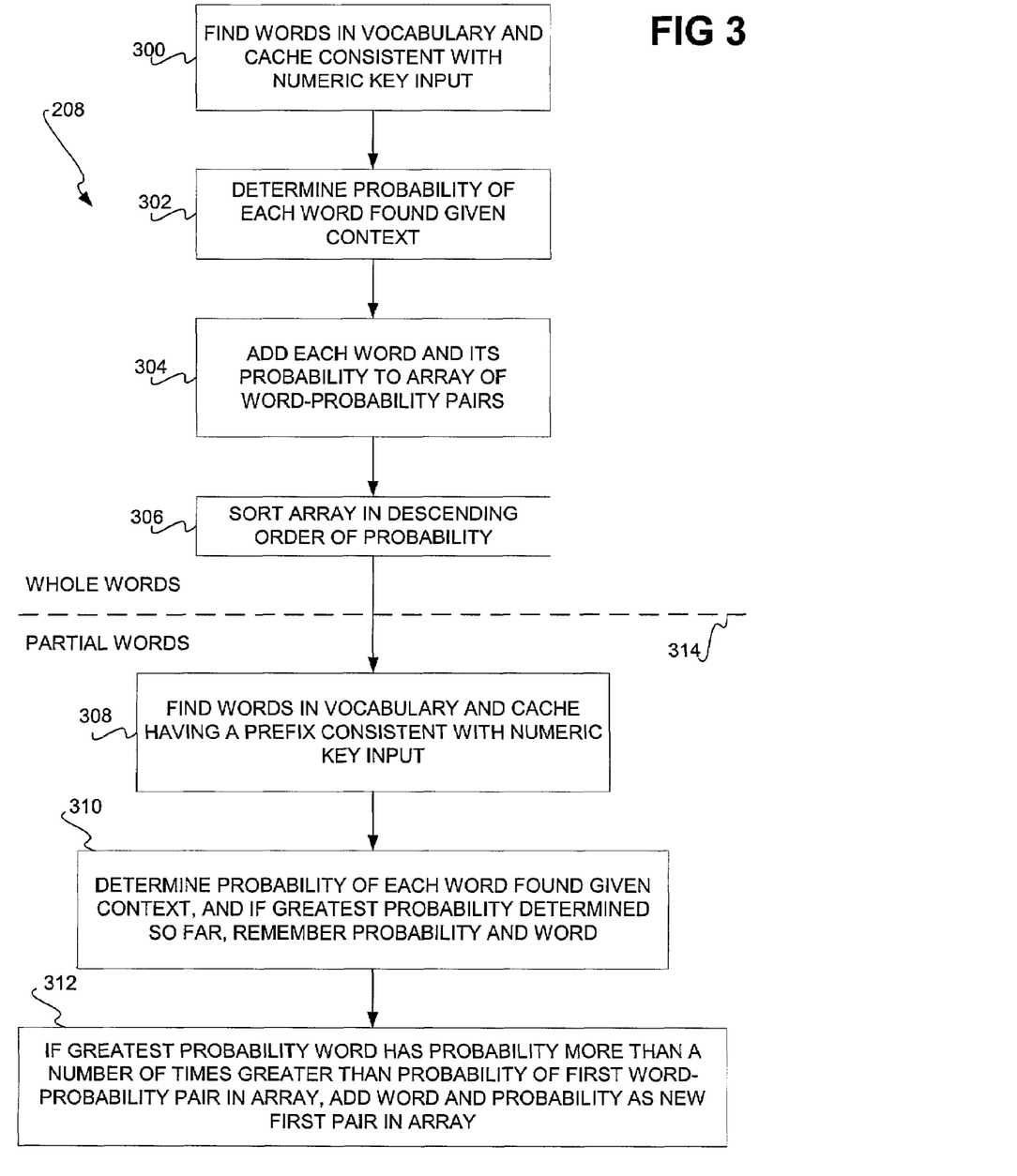
FIG. 3 is a flowchart of a method showing how one embodiment implements the word determination of FIG. 2.

FIG. 3 is a flowchart of a method showing how one embodiment implements the word determination of 204 of FIG. 2 described in the previous section of the detailed description. The method of FIG. 3 in particular implements an n-gram language model for word determination based on left context, where the word to be determined is entered using the numeric keys of the keypad 106. The method of FIG. 3 is divided into two parts, as denoted by the dotted line 314. 300, 302, 304, and 306 are above the dotted line 314, and are performed to determine the best complete word that matches the numeric key input entered by the user. Conversely, 308, 310, and 312 are below the dotted line 314, and are performed to determine the best partial word that matches the numeric key input entered by the user. In general, the best complete word is selected as the intended word, unless the best partial word is significantly more likely than the best partial word, as will be described. The part of the method of FIG. 3 above the dotted line 314 can be performed as the entire method, however, without performing the part of the method of FIG. 3 below the dotted line 314.

In 300, all the words within a predetermined vocabulary, or dictionary, that are consistent with the numeric key input are found. In addition, the words within a cache, where a cache model is being used in addition to the n-gram language model, that are consistent with the numeric key input can be found. The cache stores the last x number of words that the user has entered, in order of entry. In 302, the probability of each word found in 300, given the left context of the numeric key input relative to the words or number sequences already entered, is determined. The probability is determined based on an n-gram modeling approach, such as a bigram or a trigram modeling approach.

For example, the user may have already entered the word "run," and the word "amok" is consistent with the number sequence next entered by the user. Within a training corpus of a million words, the word "run" may appear a thousand times, and the phrase "run amok" may appear once. Thus, the probability of seeing "amok" given that the preceding word is "run" is $\frac{1}{1000}$=0.001. (Because of smoothing issues, however, the estimated probability is likely to be slightly different.) Note that without using an n-gram model, the frequency of use of the word "amok" by itself would have been the number of times the word "amok" occurred in the training corpus, perhaps only once, leading to a probability $$p(amok) = \frac{1}{1,000,000}.$$

In 304, each word found in 300, and that had its probability determined in 302, is added to an array of word-probability pairs. For example, the word-probability pair for the word "amok," based on the previous paragraph, is (amok, 0.001). Finally, in 306, the array is sorted in descending order of probability. This is one way by which the word-probability pair within the array that has the greatest probability can be determined. The word-probability pair with the greatest probability, after that the array has been sorted in 306, is the first pair within the array. Other approaches may also be used to determine the word-probability pair within the array that has the greatest probability.

In 308, the words in the vocabulary, and optionally in the cache as well, that have an initial part, or prefix, that are consistent with the numeric key input are found. For example, if the user has so far entered the number sequence 36684, the word "enough" may be found, since the first five letters of the word "enough" match the number sequence 36684. In 310, the probability of each word found in 308 given the left context of the numeric key input relative to the words or number sequences already entered is determined. The probability is determined based on an n-gram modeling approach, such as a bigram or a trigram modeling approach, as has been described. If the probability for a given word found in 308 is the greatest probability for any word found in 308 so far, then this word-probability pair is remembered, or stored, as the greatest probability word and the greatest probability, respectively.

In 310, if the greatest probability word is significantly more likely, by its measure of probability, than the word with the greatest probability within the array, then the greatest probability word is used as the intended word in lieu of the word with the greatest probability within the array. Otherwise, the word with the greatest probability within the array is used as the intended word. More specifically, where the array has been sorted in 306 in descending order of probability, if the greatest probability word is significantly more likely than the word of the first word-probability pair in the array, then the greatest probability word-greatest probability pair is inserted at the beginning of the array.

One measure that can be used to determine if the greatest probability word is significantly more likely than the word with the greatest probability within the array is whether the greatest probability word has a probability that is more than a predetermined number of times greater than the word with the greatest probability within the array. For example, the greatest probability word determined in 310 may be significantly more likely if this word has a probability more than one-hundred times that of the word with the greatest probability within the array. In this example, if the greatest probability word is significantly more likely, then the word-probability pair inserted at the beginning of the array is the pair greatest probability word-greatest probability times one hundred.

The following pseudo-code represents the method of FIG. 3 that has been described.

---

Let A be an array of Word, Probability pairs
for each word W in the vocabulary consistent with the input numbers {
    Determine probability P of W given previous n−1 words and cache;
    Add (W, P) to A
}
Sort A in decreasing order of probability.
/* Now, determine truncations */
Let BestTruncW, BestTruncP be the best truncation word and probability
for each word W in the vocabulary for which the input numbers could be
a prefix {
    Compute probability P of W given previous n−1 words and cache.
    If P > BestTruncP {
        BestTruncP := P
        BestTruncW := W
    }
}
If BestTruncP is at least 100 times more probable than A[0] .probability -continued (the probability of the best complete word) then insert (BestTruncW, BestTruncP) at the head of A
Return A

Word Determination Based on Double-Sided Context

The embodiment of the invention that determines words based on only the left context can be extended to determine words based on both the right and left context as well. The words to be determined are entered using the numeric keys of the keypad 106 of FIG. 1, where the numeric key input has a number of sequences that correspond to the words. As the user enters more words by entering additional number sequences, the words previously determined by the method can change. The additional number sequences represent new right context of the words or number sequences already entered.

The variables n(1), . . . , n(k) represent the number sequences the user has entered. The variables w(i, 1), . . . , w(i, $j_i$) represent the different words consistent with n(i). There are $j_i$ of such words. The variable w(0, 1) is a special symbol, "*START*" and the variable w(k+1, 1) is a special symbol, "*END*". These symbols are placeholders, the role of which is described later in this section of the detailed description. The most likely word sequence $w_0^*$, $w_1^*$, $w_2^*$, . . . , $w_k^* w_{k+1}^*$ is found, where each word $w_i^*$ is selected from w(i, 1) . . . w(i, $j_i$). In particular, the probability $p(w_0^*, w_1^*, w_2^*, \ldots, w_k^*, w_{k+}^*)$ is maximized. This probability can be determined using a letter n-gram model as:

$$\prod_{i=1 \ldots k+1} P(w_i^* | w_{i-n+1}^* w_{i-n+2}^* \ldots w_{i-1}^*) \quad (4)$$

In order to find the most probable such sequence, the following recursive function is defined:

$$\delta(0, ^*START^*) = 1 \quad (5)$$

and for $1 \le i \le k + 1$ $$\delta(i, w_l) = \max_{1 \le j \le j_{i-1}} \delta(i-1, w(i-1, j)) P(w_l | w(i-1, j))$$

$\delta(i, w_l)$ is the probability of the best word sequence from position 0 through position i that ends in $w_l$. Equation (5) can be determined recursively, by first determining all values for $\delta(1, \ldots)$, etc. until all values for $\delta(k+1, \ldots)$ have been determined. Appropriate values for $w_l$ in equation (5) are w(i, 0) . . . w(i, $j_i$).

Next, $w_i^*$ is set equal to:

$$w_{k+1}^* = ^*END^* \quad (6)$$

And for $0 \le i \le k$ $$w_i^* = \arg\max_{w_j} \delta(i, w_j) P(w_{i+1}^* | w_j)$$

Thus, $w_i^*$ is set to the word which resulted in the most probable path. The $w_i^*$ are also determined recursively, but in reverse order, from $W_{k+1}^*$ backwards to $w_0^*$.

The previous equations use a bigram language model. The analogous formulae for trigram equations are:

$$\delta(0, ^*START^*) = 1 \quad (7)$$

$$\delta(1, ^*START^*, w_l) = (P(w_l|)^*START^*)$$

and for $2 \le i \le k + 1$ $$\delta(i, w_m, w_l) = \max_{1 \le j \le j_{i-2}} \delta(i-1, w(i-2, j), w_m)$$
$$P(w_l | w(i-2, j), w_m)$$

$\delta(i, w_m, w_l)$ is the probability of the best word sequence from position 0 through position i that ends in words $w_m w_l$. Similarly, $w_i^*$ is set equal to $$w_{k+1}^* = ^*END^* \quad (8)$$

$$w_k^* = \arg\max_{w_j} \delta(k, w_j, ^*END^*)$$

And for $0 \le i \le k - 1$ $$w_i^* = \arg\max_{w_j} \delta(i+1, w_j, w_{i+1}^*) P(w_{i+2}^* | w_j w_{i+1}^*)$$

These formulae can also be extended to 4-grams or higher. However, 4-gram language models may be impractical in the context of limited-memory devices. For both the bigram and trigram models, the values of $w_i^*$ may be determined by maintaining backpointers during the computation of $\delta$, as known within the art. Alternatively, they may be determined using known search algorithms, such as beam thresholding.

A shorthand notation has been used to write both $p(w_1|^*START^*)$ and $p(^*END^*|w_k)$. The meaning of these probabilities depends on the user interface of the system, and what else is known. For example, if it is known that n(1) corresponds to the first word of a sentence, then the probability of $p(w_1|^*START^*)$ is that of $p(w_1|$beginning of sentence). Similarly, if the word immediately to the left of n(1) is known to be x, then the probability is $p(w_1|x)$. Alternatively, if nothing is known about the context, then a unigram probability $p(w_1)$ is used. For $p(^*END^*|w_k)$, a corresponding probability is determined. For example, if it is known that n(k) is the last word in the sentence, then the probability $p(end of sentence|w_k)$ is used. If nothing is known about the context following the last word, then no probability, or equivalently, a probability of 1, is used. Finally, if the following word is known to be x, then $p(x|w_k)$ is used.

Language Model Compression

As has been described in preceding sections of the detailed description, a language model can be used as the machine learning approach to determine the most likely word corresponding to a number sequence entered by the user. Where the language model is a bigram model, the language model as used in 204 of FIG. 2 can be a list of three-tuples (word 1, word 2, p(word 2|word 1)). These three-tuples can be stored in a variety of equivalent ways, as is known in the art, including typically storing all three-tuples with the same word1 together. The probabilities p(word 2|word 1) are determined by examining training corpora, as has been described. The resulting list of three-tuples is the table that is then used in 204 of FIG. 2 to quickly look up and determine probabilities. The resulting table can be quite large, however, and may be too large to store on a small device such as a mobile phone, a pager, a personal-digital assistant (PDA) device, or another type of small device. Therefore, the language model can be compressed or pruned before being stored on the device. That is, a compressed language model is used in lieu of an uncompressed language model.

Figure 4:
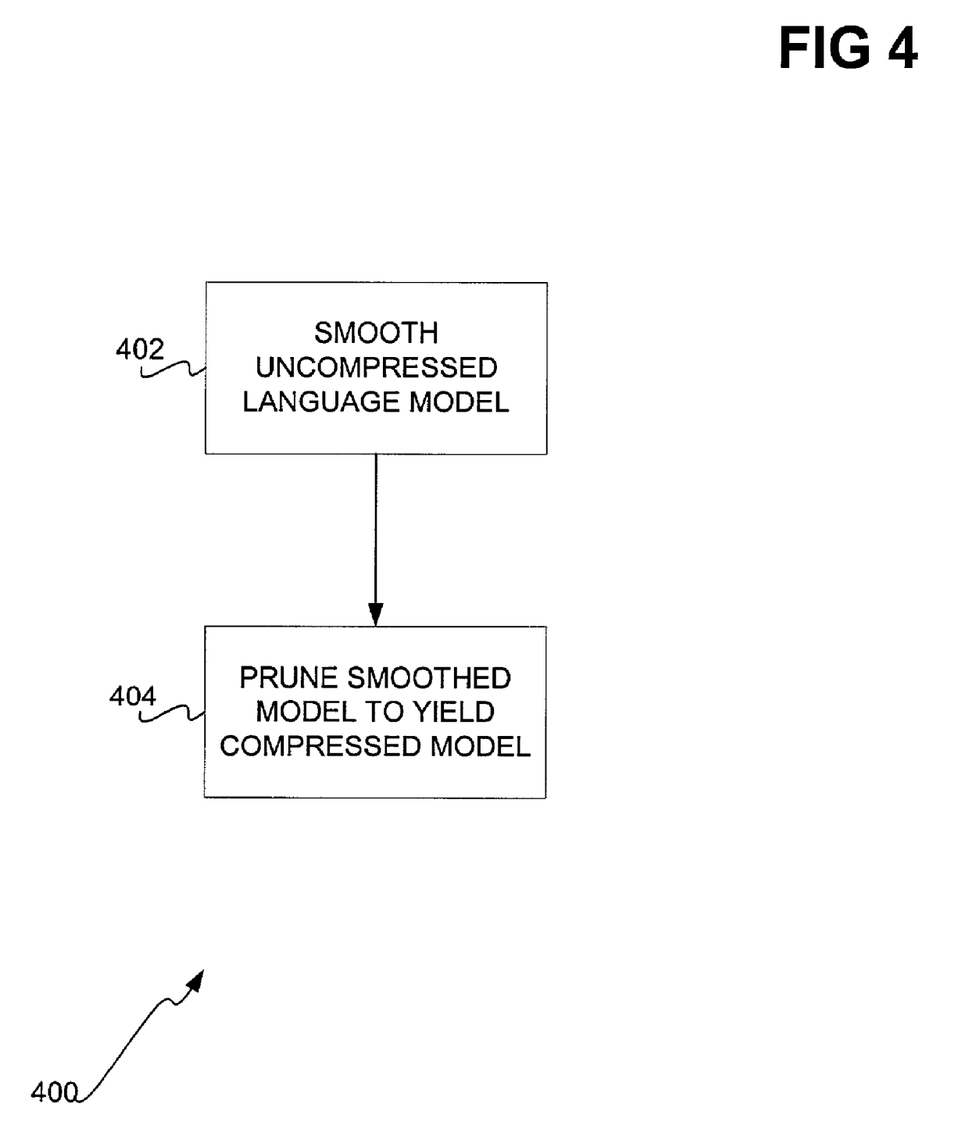
FIG. 4 is a flowchart of a method showing how a language model can be compressed according to an embodiment of the invention.

FIG. 4 is a flowchart of a method 400 showing how one embodiment can compress an uncompressed language model into a compressed language model for purposes of the invention. Other language model compression approaches can also be used. For example, the approach described in the copending and coassigned patent application entitled "Cluster and Pruning-Based Language Model Compression," filed on May 4, 2000, and assigned Ser. No. 09/565,608, may be used.

The method 400 is specifically for compressing an n-gram model. A difficulty for generating an n-gram model is that the number of times word a sequence $w_{i-2}w_{i-1}w_i$, in the specific case of a trigram model, occurs in the training corpus is that for such word sequences that do not occur in the training text, this number is zero. This means that the predicted probability of this sequence occurring is zero. This makes it impossible for a system to accept such a zero-probability sequence, no matter how unambiguous it is. Therefore, in 402, the probabilities of the uncompressed model are initially smoothed. Smoothing removes some probability from all non-zero sequence occurrences, or counts, and adds probability to the zero-count items. The added probability is typically in proportion to some less specific, but less noisy model. For example, a trigram $p(w_i|w_{i-2}w_{i-1})$ usually backs off to a bigram $p(w_i|w_{i-1})$, and the bigram usually backs off to a unigram $p(w_i)$.

Therefore, the absolute discounting backoff approach can be used to smooth the uncompressed model. Where D represents a discount, the probability for the trigram is $$p(w_i|w_{i-2}w_{i-1}) = \begin{cases} \frac{C(w_{i-2}w_{i-1}w_i) - D}{C(w_{i-2}w_{i-1})} & \text{if } C(w_{i-2}w_{i-1}w_i) > 0 \\ \alpha(w_{i-2}w_{i-1})p(w_i|w_{i-1}) & \text{otherwise} \end{cases} \quad (9)$$

$C(\blacksquare)$ is the number of occurrences of $\blacksquare$ in the training corpus, or, the count of $\blacksquare$. $\alpha(w_{i-2}w_{i-1})$ is defined so that the probabilities sum to one. The bigram is defined similarly to the trigram, backing off to the unigram. The unigram does not usually need to be smoothed. Generally, a different D is used for the bigram and the trigram. A further improvement is to use multiple discounts D, one for counts $C(w_{i-2}w_{i-1}w_i)$ =1, another for $C(w_{i-2}w_{i-1}w_i)$=2, and a final one for $C(w_{i-2}w_{i-1}w_i) \geq 3$.

Storing a language model of this form includes storing the probabilities $p(w_i|w_{i-2}w_{i-1})$ for those $C(W_{i-2}w_{i-1}w_i)>0$, as well as the $\alpha$'s. However, if the training corpus used to obtain the counts is large, the total number of parameters that need to be stored can also be quite large. Usually, the uncompressed language model is similar in size to the size of the training corpus. The larger the training corpus, the better the language model, but since there may be literally billions of words in the training corpus, a full uncompressed language model cannot be used.

Therefore, in 404, the smoothed uncompressed model is pruned to yield a compressed model. Pruning means that a portion of the counts is removed from the uncompressed model to yield the compressed model. One pruning approach is to eliminate unused counts by a count-cutoffs approach. A cutoff is chosen, such as two, and all probabilities stored in the system with two or fewer counts are removed. Separate cutoffs can be selected for bigram and trigram counts.

Another pruning approach that can be used is an entropy-based pruning technique, such as Rosenfeld pruning or Stolcke pruning. As an example, Stolcke pruning is a relative entropy-based technique. For a trigram such as p(City|New York), having a bigram p(City|York), the two probabilities are almost equal. Conversely, for a trigram such as p(hand|the other) having a bigram p(hand|other), the former probability is much larger than the latter. Therefore, Stolcke pruning safely removes p(City|New York), but not p(hand|the other). In particular, Stolcke pruning uses $$-\sum_{w_i,h_j} p(w_i, h_j)[\log p'(w_i|h_j) - \log p(w_i|h_j)]$$

as the cost of pruning, where p' is the probability assuming that this n-gram has been pruned, and p is the probability without pruning. A history $h_j$ here indicates a particular bigram or trigram context. A threshold is established, and words having a cost that is less than this threshold are pruned.

In the case of a language model used in the context of the invention, where number sequences are mapped to words, in addition to the history $h_j$, the number sequence corresponding to the word $w_i$ is also present, and is denoted as $n_i$. Therefore, instead of, for example, being interested in a probability such as p(research|good), the probability of interest is actually p(research|good, 73732724). Because the number sequence 73732724 is unambiguous, this particular probability is equal to 1. Similarly, after pruning the bigram p(research|good), the probability is still 1, and the cost of the pruning is essentially 0. Therefore, in 404, the cost of pruning used is $$-\sum_{w_i,h_j} p(w_i, h_j)[\log p'(w_i|h_j, n_i) - \log p(w_i|h_j, n_i)] \quad (10)$$

The pruning that results therefore takes into account the manner by which text is being input, entered using sequences input using a (typically numeric) reduced keypad. The pruning also takes into account which words are ambiguous, and which words are unambiguous.

The following is also noted. If p(research|good) is pruned, no effect on any other bigram is expected. However, this is not the case, because of the change to the normalization factor $\alpha$(good), which will increase. This means that the relative probabilities of words for which there are counts and for which there are not counts, either because they were zero or were pruned, will change. For example, if there are counts for C(good cat) but not for C(good act), then the probability p(cat|good) will be unchanged after pruning C(good research), while the value of $\alpha$ will have increased. Therefore, the probalility p(act|good) will have increased as well.

This effect occurs in any kind of pruning, but it is especially important in the context of this invention, for two reasons. First, while determining the entropy loss of pruning C(good research) it may be assumed that all other terms can be neglected, but given the observation of the previous paragraph, this is not the case. Second, standard pruning approaches, as well as entropy-based pruning approaches, tend to prune words with small numbers of counts. This is because typically these contribute the least to entropy reduction. Pruning words with small numbers of counts typically has only a small effect on α. However, when pruning language models in the context of the invention, words with large numbers of counts, such as C(good one), can also be safely pruned, which leads to a much larger effect on α.

To overcome these difficulties, the pruning in 404 optionally does not redetermine α after pruning. This has three important consequences. First, it means that pruning one word does not degrade performance on unrelated words. Second, since most words are unaffected, it means that determining the entropy cost of pruning a particular word is much easier. The distribution of words is no longer a true probability distribution. Since α is not correct, the conditional probabilities given the history do not sum to one. However, since the conditional probabilities of interest are usually those given the history and the number sequences, which requires renormalization anyway, this last consequence is not a problem.

Therefore, to determine the entropy loss for pruning a particular word in a particular context, the following occurs. For each word w with number sequence n in each context $h_j$, $$-\sum_{w_i \in n} p(w_i, h_j)[\log p'(w_i | h_j, n) - \log p(w_i | h_j, n)] \quad (11)$$

is determined. The summation is limited to what can be informally written as $w_i \in n$, to indicate the set of words with number sequence n. Since there will not be too many words in this set, this determination is efficient. Determining $p(w_i|h_j, n)$ is easy, by determining $$\frac{p(w|h_j)}{\sum_{w_i \in n} p(w_i | h_j)}.$$

Determining $p'(w_i|h_j, n)$ is only slightly more difficult. The same value is determined, but this time using the probabilities from the pruned distribution. Since α is not changed, all of these probabilities are the same, except for $p(w|h_j)$. To determine $p(w_i, h_j)$, $p(w_i|h_j) *p(h_j)$ is used. To determine $p(h_j)$, $(C(h_j)-D)/C(\text{all histories})$ is used. The result of the pruning in 404 is a compressed language model that can be stored in small devices such as mobile phones and other small devices.

Conclusion

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, the methods that have been described can be stored as computer programs on machine- or computer-readable media, and executed therefrom by a processor. Therefore, it is manifestly intended that this invention be limited only by the claims and equivalents thereof.

I claim:

1. A method for determining a word entered using a reduced keypad, where each of one or more keys of the reduced keypad is mapped to a plurality of letters, the method comprising:
   receiving key input corresponding to the entered word and at least one of a left context and a right context;
   determining a list of possible words corresponding to the key input for the entered word, wherein each listed word is in a vocabulary or previously entered into a cache;
   using a language model comprising probability values corresponding to sequence of word N-grams of a natural language to rank the listed words based on at least one of the left context and the right context of the key input; and
   updating the language model with additional training using words entered into the cache.

2. The method of claim 1, wherein the reduced keypad is a numeric keypad.

3. The method of claim 1, wherein the key input has at least the left context, and the word corresponding to the key input is determined based in part on the left context of the key input.

4. The method of claim 1, wherein the key input has at least the right context, and the word corresponding to the key input is determined based in part on the right context of the key input.

5. The method of claim 1, wherein the key input has both the left context and the right context, and the word corresponding to the key input is determined based both on the left context and the right context of the key input.

6. The method of claim 1, wherein using the language model comprises using a word n-gram model.

7. The method of claim 6, wherein using the n-gram model comprises using a biagram model.

8. The method of claim 1, wherein updating the language model further comprises using a cache model.

9. The method of claim 1, wherein the language model comprises a compresses language model.

10. The method of claim 1, wherein the key input has at least the left context, and wherein the word corresponding to the key input is determined based in part on the left context of the key input, and wherein using the language model comprises using a bigram model as the language model, comprising the steps:
    for each listed word determining a probability of the word given the left context, and adding the word and the probability of the word to an array of word-probability pairs; and
    sorting the array of word-probability pairs in decreasing order of probability.

11. The method of claim 10, wherein updating the language model comprises using a cache model in addition to using the bigram model, such that the probability of the word is determined given the left context and the words entered in the cache.

12. The method of claim 10, wherein using the bigram model further comprises:
    for each word in the vocabulary that is consistent with the key input as an initial part of the word, determining a probability of the word given the left context, and, upon determining that the probability so far determined, setting the greatest probability to the probability with the greatest probability to the word;
    upon determining that the greatest probability is at least a number of times greater than a word of a first word-probability pair of the array of word-probability and the greatest probability as a new first word-probability pair before the first word-probability pair within the array.

13. The method of claim 12, wherein updating the language model comprises using a cache model in addition to using the bigram model, such that the probability of the word is determined given the left context and words entered in the cache.

14. The method of claim 1, wherein the key input has both the left context and the right context and has a plurality of number sequences where each sequence corresponds to a word, the plurality of words corresponding to the key input determined by using the language model based in part on both the left context and the right context of the key input.

15. The method of claim 1, wherein the language model comprises a compressed language model, the compressed language model compresses by performing a method comprising:
   smoothing an uncompressed language model; and,
   pruning the uncompresses language model to yield the compressed language model.

16. The method of claim 15, wherein pruning the uncompressed language model comprises using one of: count-cutoffs approach, a Rosenfeld pruning approach, and a Stolcke pruning approach.

17. The method of claim 15, wherein pruning the uncompressed language model comprises determining a normalization factor for each word in the uncompressed model only prior to pruning.

18. The method of claim 15, wherein pruning the uncompressed language model accounts for ambiguous words in the uncompressed model.

19. The method of claim 15, wherein pruning the uncompressed language model accounts for an effect of the pruning on key input accuracy.

20. The method of claim 1, and further comprising executing a computer program by a processor from a computer-readable medium to perform the steps of receiving key input, determining a list of possible words, using a language model, and updating the language model.

21. A computer-readable medium having instructions stored thereon for execution by a processor to perform a method for determining a word entered using a reduced keypad, where each of one or more input keys of the reduced keypad is mapped to a plurality of letters, the method comprising:
   receiving key input corresponding to the word and a left context;
   for each word in a vocabulary that is consistent with the key input, determining an n-gram probability of the word given the left context, and adding the word and the n-gram of the word to an array of word-probability pairs, wherein the n-gram probabilities are stored in a language model trained at least in part on words entered in a cache, the language model comprising n-gram probabilities corresponding to sequences of words in a natural language;
   determining the word corresponding to the key input as a word of a word-probability pair within the array of word-probability pairs having a greatest probability; and
   updating the language model based on words previously entered into the cache.

22. The medium of claim 21, wherein the reduced keypad is a numeric keypad.

23. The medium of claim 21, wherein determining the word corresponding to the key input comprises:
   sorting the array of word-probability pairs in decreasing order of probability; and
   determining the word corresponding to the key input as a word of a first word-probability pair within the array of word-probability pairs.

24. The medium of claim 21, the method further initially comprising, for each word in the cache that is consistent with the key input, determining a probability of the word given the left context, and adding the word and the probability of the word to an array of word-probability pairs.

25. The medium of claim 21 the method further comprising prior to determining the word corresponding to the key input:
   for each word in the vocabulary is consistent with the key input as an initial part of the word, determining a probability of the word given the left context, and, upon determining that the probability is greater than a greatest probability so far determined, setting the greatest probability to the probability and a greatest probability word associated with the greatest probability to the word;
   upon determining that the greatest probability is significantly more likely than a word of a first word-probability pair of the array of word probability-pairs, adding the greatest probability word associated with the greatest probability and the greatest probability as a new first word-probability pair to the array.

26. The medium of claim 25 the method further initially comprising prior to determining the word corresponding to the key input, for each word in the cache that is consistent with the key input as an initial part of the word, determining a probability of the word given the left context, and, upon determining that the probability is greater than the greatest probability so far determined, setting the greatest probability to the probability and a greatest probability word associated with the greatest probability to the word.

27. A method for determining a word entered using a reduced keypad, wherein each of one or more keys of the reduced keypad is mapped to a plurality of letters, the method comprising:
   receiving key input corresponding to the word and at least one of a left context and a right context;
   determining the word corresponding to the key input by using a compressed language model based one or more of the at least one of the left context and the right context of the key input, wherein the language model comprises probabilities corresponding to N-gram word sequences of a natural language;
   updating the language model with additional training using at least words previously entered in a cache; and
   compressing the language model by performing the steps of:
      smoothing the language model; and
      pruning the language model to yield the compressed language model.

28. The method of claim 27, wherein the reduced keypad is a numeric keypad.

29. The method of claim 27, wherein pruning the uncompressed language model comprises using one of: count-cutoffs approach, a Rosenfeld pruning approach, and a Stolcke pruning approach.

30. The method of claim 27, wherein pruning the uncompressed language model comprises determining a normalization factor for each word in the uncompressed model only prior to pruning.

31. The method of claim 27, wherein pruning the uncompressed language model accounts for ambiguous words in the uncompressed model.

32. The method of claim 27, wherein pruning the uncompressed language model accounts for an effect of the pruning on key input accuracy.

33. The method of claim 27, and further comprising executing a computer program by a processor from a computer-readable medium to perform the steps of receiving key input; training a language model using words entered in a cache; compressing the language model; and determining the word corresponding to the key input.

34. An apparatus comprising:
- a plurality of keys, each of one or more of the keys mapped to a plurality of letters, the plurality of keys used to enter key input corresponding to a word and at least one of a left context and a right context; and,
- a word-determining logic designed to construct a list of possible words corresponding to the entered word and ranking the listed words to determine the word corresponding to the key input by using a language model based on one or more of the at least one of the left context and the right context of the key input, wherein the language model comprises N-gram probability values corresponding to sequences of words in a natural language, and wherein the language model is updated based on words previously entered into a cache by a user.

35. The apparatus of claim 34, further comprising a display on which the at least one of the left context and the right context, and the word corresponding to the key input, are displayed.

36. The apparatus of claim 34, wherein the apparatus is a telephone.

37. The apparatus of claim 36, wherein the apparatus is a mobile telephone.

38. The apparatus of claim 36, wherein the apparatus is one of: a cellular telephone, a corded telephone, a cordless telephone, a digital telephone, and a radio telephone.

39. The apparatus of claim 34, wherein the apparatus is one of: a pager, a desktop computer, a laptop computer, a handheld device, a personal-digital assistance (PDA) device, and a remote control device.

40. The apparatus of claim 34, and further comprising a computer-readable medium that stores the word-determining logic comprising a computer program for execution by a processor.

41. The apparatus of claim 34, wherein the key input has at least the left context, and the word corresponding to the key input is determined by the word-determining logic by training the language model based in part on the left context of the key input.

42. The apparatus of claim 34, wherein the key input has at least the right context, and the word corresponding logic by training the language model based in part on the right context of the key input.

43. The apparatus of claim 34, wherein the key input has both the left context and the right context, and the word corresponding to the key input is determined by the word-determining logic by training the language model based in part on both the left context and the right context of the key input.

44. The apparatus of claim 34, where the word-determining logic updates the language model using a cache model.

* * * * *